United States Patent [19]

Kishimoto

[11] Patent Number: 4,543,997

[45] Date of Patent: Oct. 1, 1985

[54] PRESSURE ACCUMULATOR

[76] Inventor: Masayuki Kishimoto, 1744 Takahashi, Ogasa-Cho, Ogasa-Gun, Japan

[21] Appl. No.: 577,850

[22] Filed: Feb. 7, 1984

[51] Int. Cl.[4] ............ F16L 55/04

[52] U.S. Cl. ............ 138/30; 220/85 B

[58] Field of Search ............ 138/26, 30; 220/85 B

[56] References Cited

U.S. PATENT DOCUMENTS 2,347,379 4/1944 Teeter ............ 138/30

2,924,359 2/1960 Beremand ............ 138/30 X 3,862,708 1/1975 Waxlax ............ 138/30 X 4,413,652 11/1983 Allewitz ............ 138/30 X

*Primary Examiner*—James E. Bryant, III

[57] ABSTRACT

A pressure accumulator having a shell with the upper portion forming a dome having an axial gas opening, the shell having an axial oil port opposed to said gas opening, a holder in said shell supporting a bladder, a movable convex structure positioned in the shell between the holder and the gas opening, said convex structure having an annular ring elastic sealing material positioned on the exterior of said convex structure and adapted to engage the inner surface of said shell.

3 Claims, 4 Drawing Figures

PRESSURE ACCUMULATOR

The present design concerns an improvement to the accumulator. To describe it more specifically, the design offers an improved sealing structure for the opening of the accumulator which confines the gases.

Well-known designs for conventional accumulators, such as disclosed in Japanese U.M. application No. 56/24321, filed Feb. 23, 1981, are shown in FIGS. 1 and 2 and are characterized by the fact that an amply elastic rubber bladder (b) placed in the interior space (a) seals nitrogen gas within. The elasticity of this bladder serves to maintain the pressure of the fluid body. In such structures, the nitrogen gas entering through gas-sealing opening (d) created at the top of the shell (c) is contained by a sealing structure (FIG. 1) in which said gas-sealing opening (d) is composed of two stages—a section with a large diameter ($d_1$) and another with a smaller diameter ($d_2$)—, a steel ball (e) being inserted inside the section with a large diameter ($d_1$) and a bolt (f) being screwed in place to secure the structure. In another sealing design (FIG. 2), a bolt (h) and nut (i), having a washer (g) inserted between them, are screwed in place at the center of the gas-sealing opening (d). According to such technology, however, the above-described sealing structure are used at the gas-dealing opening (d) and when said opening (d) is accidentally released or damaged, the nitrogen gas contained within the inside chamber (a) in condensed form may be released with great force thereby increasing the operative risk. Fixation of the gas-sealing opening (d) by electric welding to prevent such an occurrence resulted in the burning or deformation of the sealing structures such as the above-mentioned bolt (f), leaving many unsolved problems in the design of the sealing structure.

In view of such a situation, the present design for an improved accumulator is proposed to solve all the problems described above. Specifically, the present accumulator forms a dome-like structure for the upper half of the shell with a gas-sealing opening near the apex which corresponds to the upper edge of the axial direction. It is equipped with a projecting holder to affix the bladder lining the inner lateral surface of said shell. In such an accumulator, a slightly convex structure with an opposing surface having a curvature roughly identical to that of the inner surface of the upper half of the said shell is placed above said holder in a manner such that said structure is slightly mobile in the axial direction. In addition, a rubber-like elastic sealing material is attached in the area between said slightly convex structure and the upper half of the shell. Thus, with pressure changes within the internal chamber, the aforementioned convex structure moves slightly along the axial direction (and travels up with a rise in the pressure) to seal the nitrogen gas contained by the above-described sealing material.

In the accompanying drawings in which are shown one or more of various possible embodiments of the several features of the invention;

Figure 1:
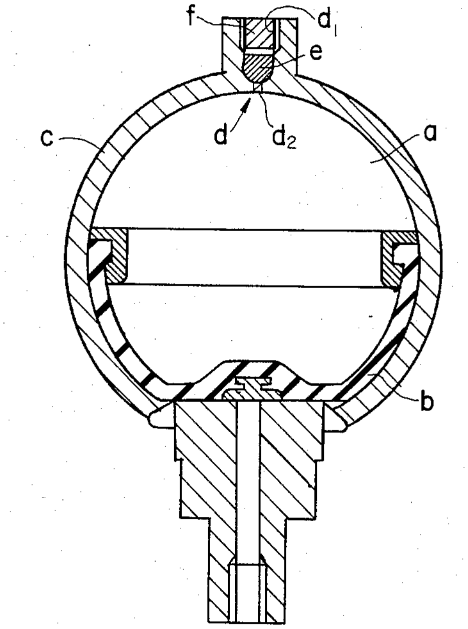
FIG. 1 PRIOR ART
FIGS. 1 and 2 show vertical sections of conventional accumulators.
Figure 2:
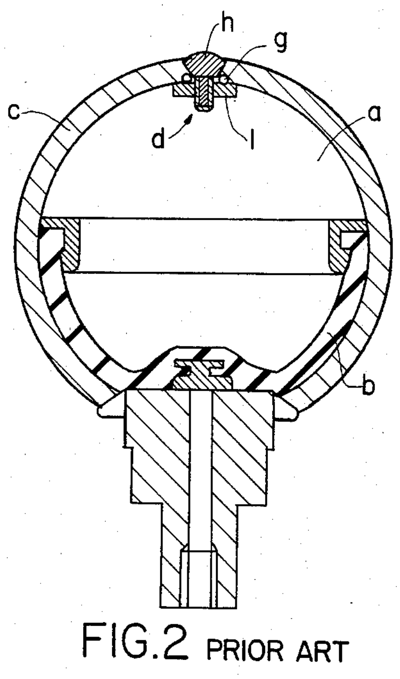
FIG. 2 PRIOR ART
Figure 3:
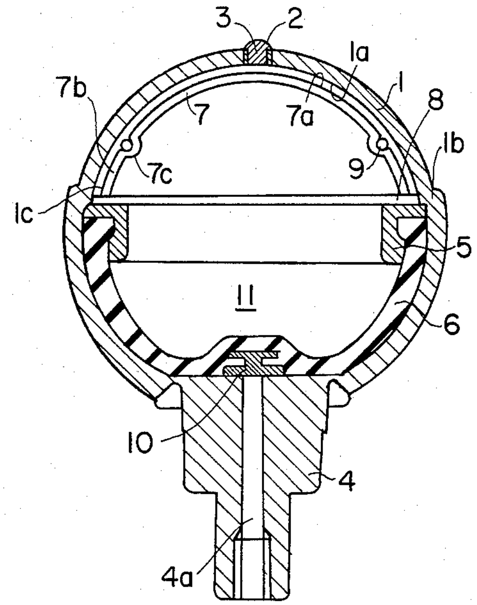
FIG. 3 shows a vertical section of an accumulator of the present design and FIG. 4 illustrated a vertical section of a shell before the drawing process.

The application of the accumulator of the present design is further described with the aid of FIG. 3. The figure shows a metal shell (1) which is approximately spherical in shape. It forms a dome-like inner wall (1*a*) for the upper half in the upper section in the axial direction (the upper section of the figure) as well as a ring-like stepped portion (1*b*) at the lower section which projects outward at the periphery. At the apex of said shell (1) which corresponds to the uppermost area in the axial direction, gas-sealing opening (2) is created and is fitted with screw (3). At the base, the lowest section of said shell (1), oil port (4) is welded. A holder (5) with a hook-shaped cross section serves to hold rubber bladder (6). Said holder is positioned at the stepped portion (1*b*) of the aforementioned shell (1) and is affixed to inner lateral wall (1*c*) of shell (1). A slightly convex metallic structure (7) has an opposing surface (7*a*) with a curvature roughly identical to that of inner wall (1*a*) of the upper half of the aforementioned shell (1). The outer diameter of theperipheal section (7*b*) is made slightly smaller than the inner diameter of the area formed by inner lateral wall (1*c*) of shell (1) so that the metallic convex structure may be inserted above holder (5). A small space (8) is formed between the peripheral section (7*b*) of the convex structure and holder (5) so that said convex structure (7) may move slightly along the axial direction when it is inserted above holder (5) within shell (1). Furthermore, an annular grove (7*c*) is formed in the midsection of said convex structure (7) and an O-ring (9), made of a rubber-like elastic seal material, is attached to said ring-like concave section (7*c*) in such a manner that it projects from the opposing surface (7*a*). In the figure, a vulcanized metal poppet (10) is attached to bladder (6) and serves to close hole (4*a*) created in oil port (4).

The accumulator constructed in the manner described above is explained next. The internal chamber of shell (1) is divided by bladder (6) into an upper section (11) and a lower section (not indicated in the figure). An appropriate quantity of nitrogen gas is sealed inside after it enters upper section (11) through gas-sealing opening (2). Nitrogen gas then travels between inner wall surface (1*a*) of the upper half of shell (1) and opposing surface (7*a*) of slightly convex structure (7), after which the gas-sealing opening (2) is fastened with screw (3) and the accumulator is ready for use. When fluid flows from oil port (4) into the lower section, pushing bladder (6) up and raising the nitrogen gas pressure, such pressure forces convex structure (7) upward, and washer (9) attached to the ring-like concave part (7*c*) of the convex structure (7) into contact with the inner wall surface (1*a*) of the upper half of shell (1), thus sealing nitrogen gas in that section. In such a condition, therefore, nitrogen gas is unlikely to be released at a great force and the structure is safe even when screw (3) is accidentally loosened or gas-sealing opening (2) is damaged.

Figure 4:
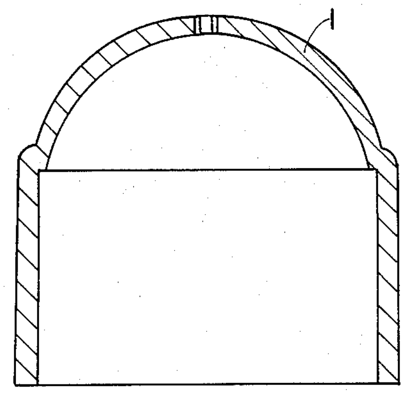

The accumulator having the above described structure is produced in the following manner: first, shell (1), as shown in FIG. 4, is produced, and the slightly convex structure (7) with washer (9), holder (5) meshed with bladder (6), and oil port (4) are inserted in it; the lower half of shell (1) is then subjected to a drawing process; and oil port (4) and the base of shell (1) are welded together. If gas-sealing (2) is to undergo electrical welding after it is fitted with screw (3), it is desirable that ring-like convex section (7*c*) of slightly concave structure (7), where washer (9) is attached, be formed at a certain distance from gas-sealing opening (2) so that said washer (9), a rubber-like elastic material that has already been installed in shell (1), is not exposed to the thermal effect of the electrical welding process. Washer (9) may be attached on inner wall surface (1*a*) of the upper half of shell (1), or else the ring-like concave section (7*c*) is set at both inner wall surface (1*a*) of the upper half of shell (1) and slightly convex structure (7) while washer (9) is inserted between the two. Besides threading, screw (3) may be pressure-fitted in gas-sealing opening (2).

The accumulator of the present design has the above-described structure. In such an accumulator, a slightly convex structure is inserted in the upper half of the shell which has a gas-sealing opening. Nitrogen gas is sealed in by adjoining the rubber-like elastic sealing material attached to said convex structure and the inner wall surface of the shell. Such a design effectively prevents an accidental overflow of nitrogen gas from the gas-sealing opening and greatly increases the safety level of the operation. Therefore such a design has a significant practical value.

Having thus described the invention and illustrated its use, what is claimed as new and is desired to be secured by Letters Patent in the United States is:

1. An accumulator comprising a shell having an upper concave half including a apex coincident with the axis of said shell, a gas sealing opening formed substantially at said apex of said shell, a holder mounted in said shell, a bladder mounted on said holder, a convex member disposed in said upper concave half of said shell, the curvature of said convex member corresponding substantially to the curvature of said concave half, said convex member being disposed in registry with an in proximate spaced relation to said apex of said shell, said convex member being movable axially toward and away from said apex, and an annular elastic seal member interposed between said convex member and said upper concave half, said seal member being positioned to define a seal between said convex member and said upper concave half in an area surrounding said opening when said convex member is shifted toward said apex.

2. An accumulator in accordance with claim 1 wherein said seal member comprises an O-ring mounted on said convex member.

3. An accumulator in accordance with claim 2 wherein said convex member includes an annular groove and said O-ring is mounted in said groove.

* * * * *